Patented Dec. 2, 1930

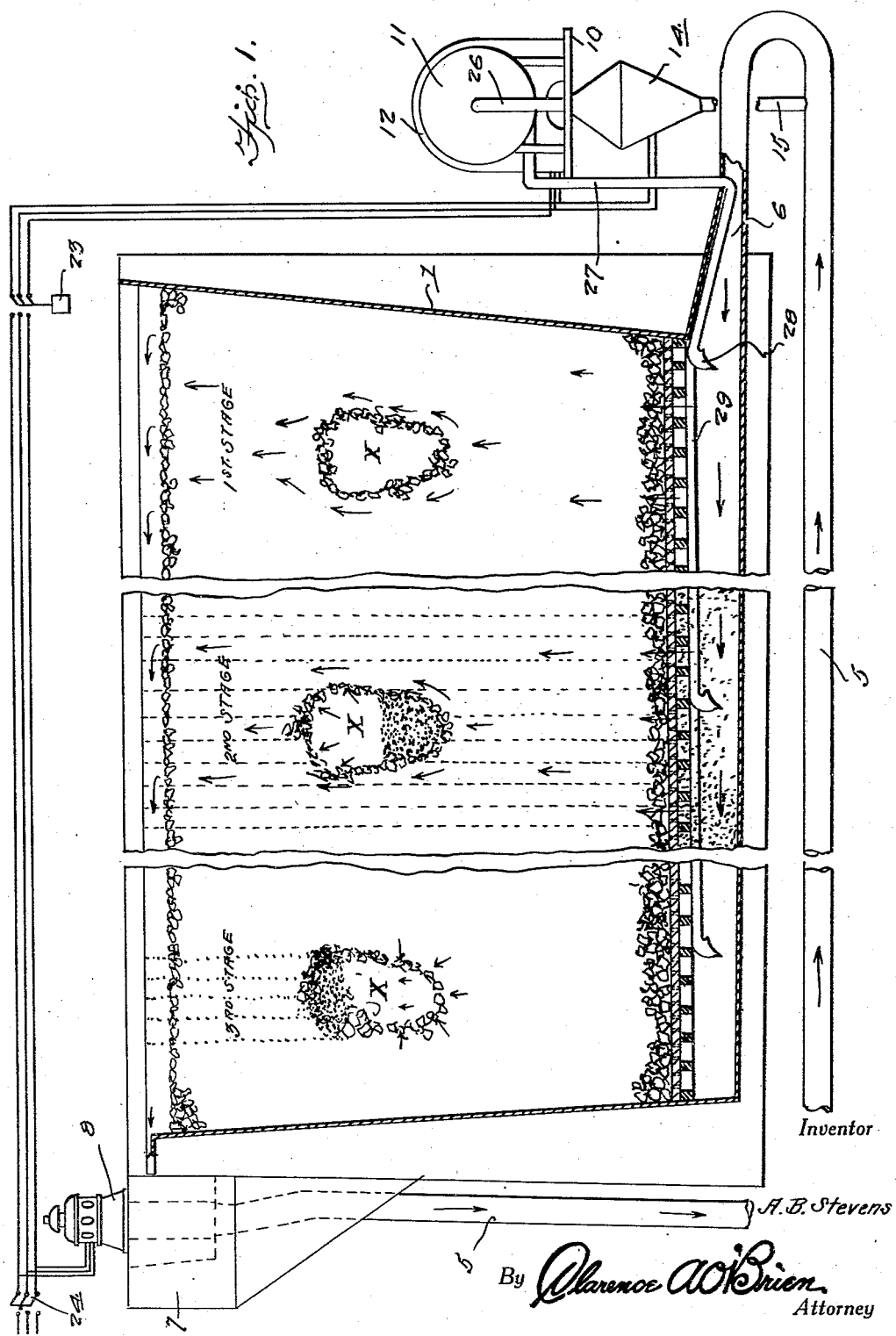

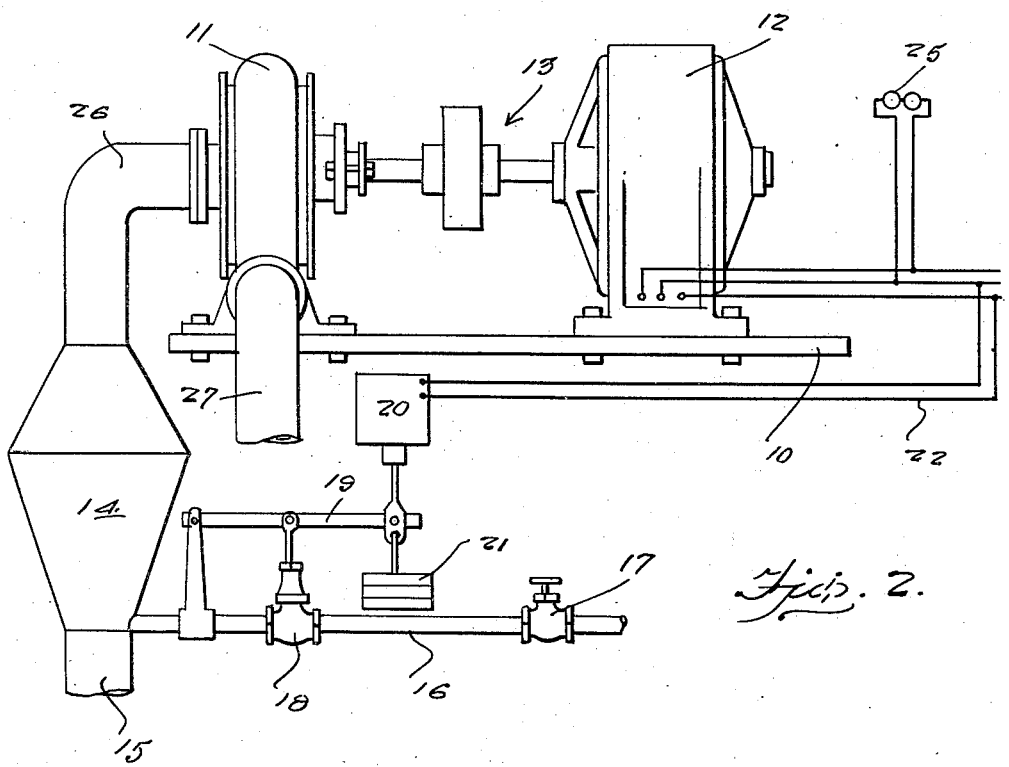
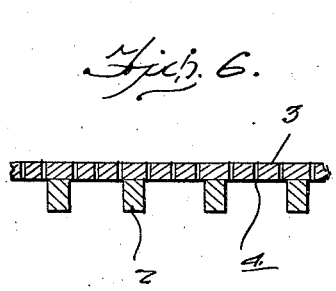
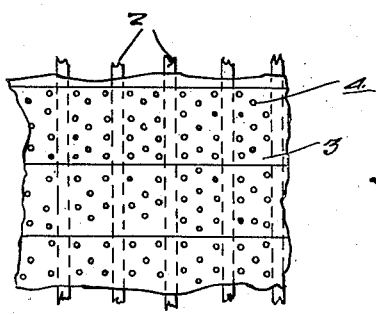
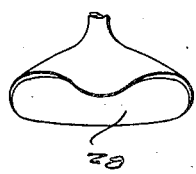
Inventor
A. B. Stevens.
By Clarence A. O'Brien
Attorney

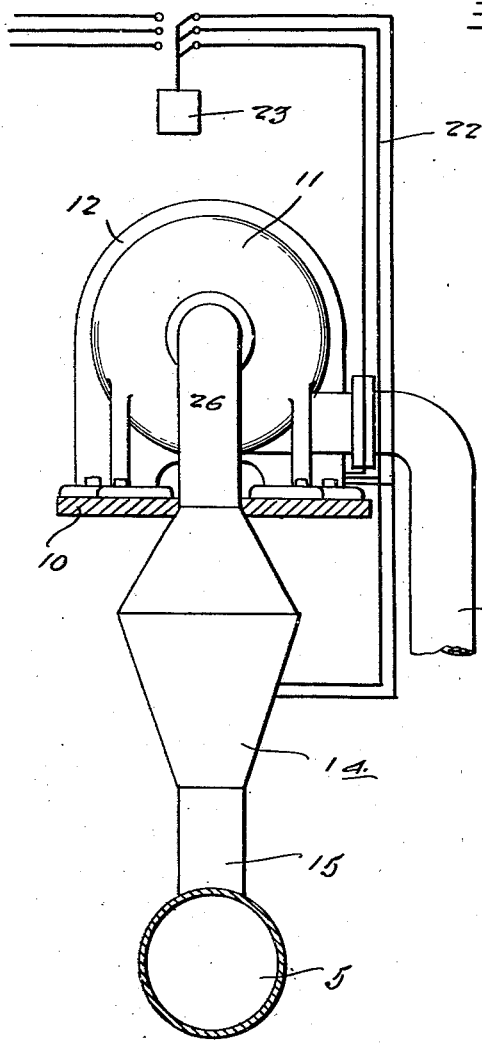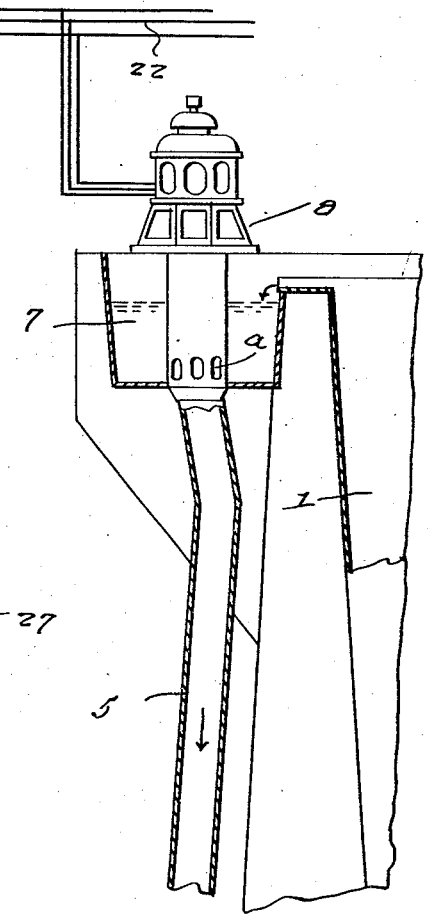

1,783,591

UNITED STATES PATENT OFFICE

ALBERT B. STEVENS, OF INSPIRATION, ARIZONA

APPARATUS FOR LEACHING AND WASHING ORES BY THE USE OF GAS

Application filed January 26, 1929. Serial No. 335,259.

The present invention relates to an apparatus for leaching and washing ores by mixing gases with the leaching liquor; and has for its principal object to provide an apparatus that includes the use of a high speed centrifugal pump for the purpose of pumping the leaching liquor and at the same time agitating and thoroughly mixing the gas with it.

Another important object is to provide a process that provides for the admixture of gas with the leaching liquor that is to be carried through the ore beds, the gas being subsequently dispelled in the ore beds.

Another object is to provide an improved process of the above mentioned character that will create an oxidizing atmosphere within the leaching bed as well as to tend to loosen up tight tanks by the alternate gas and solution displacement, the process further aiming to prevent certain chemically reactive constituents precipitating out of the leaching liquor by neutralization and subsequent reduction.

Another object is to provide an improved process of the above mentioned character that will prevent the cementing of the parts of the ore bed due to stagnation followed by a neutralization and the precipitation of some of the liquid constituents. Said process will also help in the washing of the leached tailings after leaching by causing a more intimate contact of the washing solution with the tailings.

A further object of the invention is to provide a device of the above mentioned character, which is simple in construction, inexpensive, strong and durable and further well adapted to the purposes for which it is designed.

Other objects and advantages will become apparent during the course of the following description.

In the accompanying drawings, forming a part of this specification, and in which like numerals indicate like parts throughout the same:

Figure 1 diagrammatically illustrates my improved apparatus by which the proposed process is carried out.

Figure 2 is an elevational view of the centrifugal atomizing pump showing its association with electric high speed motor and the gas mixing chamber and also showing the gas supply pipe which supplies the gas to the mixing chamber, Figure 3 is an end elevation of the centrifugal pump and the gas mixing chamber, Figure 4 is a detail view of the circulating pump used in conjunction with the present apparatus, Figure 5 is a fragmentary plan view of the floor and false bottom of the leaching tank, Figure 6 is a sectional view therethrough, and Figures 7 and 8 are details of the funnel shaped discharge nozzles associated with the leaching liquor discharge pipe that is disposed within the bottom of the leaching tank below the perforated floor or false bottom.

In the drawings wherein for the purpose of illustration is shown the preferred embodiment of my invention, the numeral 1 designates a conventional leaching tank that is open at its top, a false bottom or floor being arranged in the tank on the supporting bars 2 and as clearly shown in Figures 5 and 6, the false bottom consists of perforated floor forming sections 3, the perforations being indicated by the reference character 4. The ore that is placed in the tank will rest on the perforated floor 3 as suggested very clearly in Figure 1.

A leaching liquor supply pipe 5 has communication at one end with the bottom of the tank 1 below the false bottom or floor 3 as at 6 while the other end of this supply pipe has communication with a chamber 7 located at one end at the tank for communication with the top thereof and a circulating pump denoted generally by the numeral 8 and arranged within this chamber 7 in communication with the supply pipe 5 as more clearly disclosed in Figure 4.

My improved apparatus to be used in conjunction with the present process of leaching ores includes the provision of a suitable support 10 on which is mounted a centrifugal pump 11 of a conventional construction, the centrifugal pump being operated by a suitable high speed electric motor shown at 12 which is also mounted on the support 10.

The driving connection between the centrifugal pump 11 and this motor is indicated generally at 13 in Figure 2. A gas mixing chamber 14 has communication with the circulating pipe 5 through the medium of the branch pipe 15 which branch pipe extends into the bottom of the mixing chamber 14.

A gas supply pipe also has communication with the lower portion of the mixing chamber 14 as shown very clearly in Figure 2 and arranged within this gas supply pipe is a manually controlled valve 17 and an electrically controlled valve 18. A pivoted arm 19 is associated with the slide valve 18 and a solenoid 20 has operative connection with the free end of the arm 19 for electrically controlling said valve to hold the same in an open position during the operation of the apparatus.

A weight 21 is also connected with the free end of the arm 19 for automatically closing the slide valve 18 when the circuit to the solenoid 20 is broken. The electric circuit for association with the present apparatus is indicated at 22 and arranged in this circuit is the automatic time relay 23.

A control switch 24 is arranged in the circuit 22 as is also the pair of pilot lights 25. The motor 12 is operatively associated with the electric circuit 22. The pipe 26 extends from the end of the centrifugal pump 11 for communication with the top of the mixing chamber 14 while a discharge pipe 27 extends from the periphery of the centrifugal pump 11.

The discharge pipe 27 extends downwardly for disposition through the inlet neck 6 arranged at the bottom of the tank 1 at one end thereof and then the pipe 27 is directed laterally for position within the bottom of the tank below the false bottom supporting bars 2. At spaced intervals, discharge funnels such as are shown at 28 in Figures 7 and 8 of the drawings extend from the horizontally disposed portion 29 of the pipe 27 as indicated in Figure 1.

The operation of the apparatus may be briefly stated as follows. The leaching liquor flows through the pipe 5 in the direction of the arrows and a portion is diverted into the chamber 14 through the pipe 15 while the greater portion continues to flow into the inlet neck 6 in the bottom of the leaching tank 1.

The portion of the leaching liquor that flows into the chamber 14 through the pipe 15 admixes with the gas that enters the chamber 14 through the pipe 16. There the gas is mixed into the solution by means of jets through which the gas passes into the solution. The gas is then in the solution in the form of large or small bubbles. This mixture then passes from the mixing chamber through the pipe 26 into the atomizing centrifugal pump 11 where it is churned up due to the severe beating effect of the pump blades revolving at a very high velocity.

When it emerges from the pump through the discharge pipe 27, it is in the form of a froth, the gas having been broken up to very fine particles. This froth enters the leaching tank 1 through the discharge nozzles 28 where it mixes with the inflowing liquor. The number of the funnels or nozzles depends on the size of the tank that is undergoing treatment.

The gas particles at this time are very small so that their buoyancy in the solution is comparatively small. They will, therefore rise very slowly and so will be carried along by the solution and distributed over the bed whence they will gradually work their way upward through the ore.

The balance of the operation of the apparatus is thought to be readily obvious from the construction disclosed. A holding solenoid 20 is energized by the same switch that controls the operation of the motor and the centrifugal pump and the duty of the solenoid is to keep the gas inlet valve working. In case the motor circuit becomes broken and stops, the solenoid is released and the valve 18 is automatically closed through the medium of the weight 21. The main apparatus circuit is energized to the circuit in a pump switch.

The method or process of leaching ore by the upward percolation method may be briefly stated as follows. Starting with the ore in the process of leaching by the upward percolation method, the leaching tank is filled with finely crushed ore to which the leaching solution is to be pumped from below by means of the circulating pump 8.

The solution is taken into the pump in the chambers 7 and a and is then caused to circulate through the pipe 5 and is discharged into the bottom of the tank 1 through the medium of the inlet neck 6. The solution thence finds its way through the perforations 4 on the false bottom 3 into the ore finally working its way upward through the ore to the surface, whence it flows off of the top of the tank.

As this leaching solution passes through the ore bed, the solvent extracts a portion of the values from the ore. This process is continued until the values within the ore are depleted. Taking a hypothetical case, the solution when passing up through the ore meets an obstruction, in this case a section of the ore with more resistance than the surrounding as represented by $x$ in the first stage in Figure 1.

The solutions shun this section for the portion affording less resistance about the sides. The path of the flow is denoted by the small black arrows.

The second stage of the process begins with the admission of a mixture of atomized gases with the solution. These gas particles work their way up through the ore due to their slight buoyancy and are also carried upward by the current. As they come up underneath the obstruction X and pass around the sides, parts of these particles will find their way into this section.

This inclusion of gas in the section $x$ continues until the section is nearly filled. As these particles pass into the section $x$, they displace the weaker solution therein and the particles after entering are held there by the pressure of the upward rising solution on the outside. This second stage is clearly shown in Figure 1.

After the area X has been filled with gas particles, the external pressure is reduced by cutting off the circulation to the tank. This is effected by stopping the circulating pump 8. When the external pressure is thus reduced and the gas particles due to their buoyancy in solution start to rise and leave the section $x$, they are displaced by the stronger solution from around the sides and bottom.

This is denoted by the third stage. When the gas has been dispelled, the section $x$ contains relatively stronger solution than it did at the start. The pump 8 is again started and circulation is resumed. The process is repeated as often as necessary to thoroughly leach all of the highly resistent portions of the ore.

A process of this character is particularly adapted for use in leaching said copper ores and particularly by the upward percolation methods. This process will create an oxidizing atmosphere within the leaching bed and will also loosen up tight tanks by the alternate gas and solution displacement. It will also oxidize certain valuable constituents in the leaching liquor, thus assisting in making it more effective chemically.

It will also prevent certain important chemically reactive constituents from precipitating out of the leaching liquor by neutralization and subsequent reduction. This refers to what might happen in case a leaching bed becomes relatively inactive in parts. It will also tend to prevent the cementing of parts of the ore bed due to stagnation.

Furthermore the process will help in the washing of the leached tailings after leaching by causing a more intimate contact of the washing solution with the tanks.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. A leaching apparatus of the class described comprising in combination, a leaching tank, a perforated false bottom in the tank providing a chamber in the lower end of a leaching liquor supply pipe having communication with the chamber at one end thereof, a gas supply pipe, a mixing chamber into which one end of the gas supply pipe extends, a branch pipe affording communication between the leaching liquor pipe and the bottom of the mixing chamber, a discharge pipe extending from the mixing chamber through which the mixture of gas and leaching liquor flows, a delivery pipe having communication with said discharge pipe disposed within the chamber of the leaching tank, said delivery pipe being provided with rearwardly and downwardly directed discharge nozzles at spaced intervals for discharging the mixture of leaching liquor and gas into the chamber in a direction substantially reverse to the direction of flow of the incoming leaching liquor in a manner to thoroughly mix same.

2. A leaching apparatus of the class described comprising in combination, a leaching tank, a perforated false bottom in the tank providing a chamber in the lower end thereof, a leaching liquor supply pipe having communication with the chamber at one end thereof, a gas supply pipe, a mixing chamber into which one end of the gas supply pipe extends, a branch pipe affording communication between the leaching liquor pipe and the bottom of the mixing chamber, a discharge pipe extending from the mixing chamber through which the mixture of gas and leaching liquor flows, a delivery pipe having communication with said discharge pipe disposed within the chamber of the leaching tank, said delivery pipe being provided with rearwardly and downwardly turned discharge nozzles at spaced intervals, for discharging the mixture of leaching liquor and gas into the chamber in a direction substantially reverse to the direction of flow of the incoming leaching liquor in a manner to thoroughly mix same and a centrifugal pump associated with the discharge pipe extending from the mixing chamber.

In testimony whereof I affix my signature.

ALBERT B. STEVENS.